United States Patent [19]
Tomita et al.

[11] Patent Number: 5,222,538
[45] Date of Patent: Jun. 29, 1993

[54] METHOD AND APPARATUS FOR ASSEMBLING TIRE AND WHEEL

[75] Inventors: Naotaka Tomita; Hiroshi Kawabe; Toshiyuki Watanabe, all of Kodaira, Japan

[73] Assignee: Bridgestone Corporation, Tokyo, Japan

[21] Appl. No.: 940,345

[22] Filed: Sep. 3, 1992

[30] Foreign Application Priority Data

Sep. 3, 1991 [JP] Japan .................................. 3-223073

[51] Int. Cl.⁵ .............................................. B60C 25/00
[52] U.S. Cl. ...................................... 157/1; 157/1.17; 157/1.24
[58] Field of Search .................... 157/1, 1.17, 1.22, 1.24

[56] References Cited

U.S. PATENT DOCUMENTS

| | | |
|---|---|---|
| 2,900,015 | 8/1959 | Harrison . |
| 2,923,346 | 2/1960 | Twiford .................................. 157/1 |
| 3,489,198 | 1/1970 | Malinski ......................... 157/1.24 X |
| 3,493,028 | 2/1970 | Strang et al. ............................ 157/1 |
| 4,093,015 | 6/1978 | Malinski . |
| 4,262,727 | 4/1981 | Schifferly ........................... 157/1.24 |

FOREIGN PATENT DOCUMENTS 50-104302 8/1975 Japan .
61-34885 10/1986 Japan .

*Primary Examiner*—James G. Smith
*Attorney, Agent, or Firm*—Sughrue, Mion, Zinn, Macpeak & Seas

[57] ABSTRACT

A method for assembling a tire on a wheel without causing any detrimental deformation of bead portions of the tire. The tire is obliquely arranged on a wheel cap-shaped jig provided on the upper side surface of the wheel located on a flat surface to arrange the lower part of the lower bead portion loosely around the wheel. The lower part of the tire is inwardly urged, while the other part of the lower bead portion is radially outwardly expanded to arrange it along its circumference around the wheel, progressively. Moreover, the part of the upper bead portion is radially outwardly expanded and is urged downward toward the support surface to arrange it loosely around the wheel. The part of the tire corresponding to the part of the upper bead portion is inwardly urged, while the remaining part of the upper bead portion is radially outwardly expanded and is urged downward toward the support surface along the circumference of the upper bead portion to arrange it around the wheel, progressively.

15 Claims, 11 Drawing Sheets

FIG_1
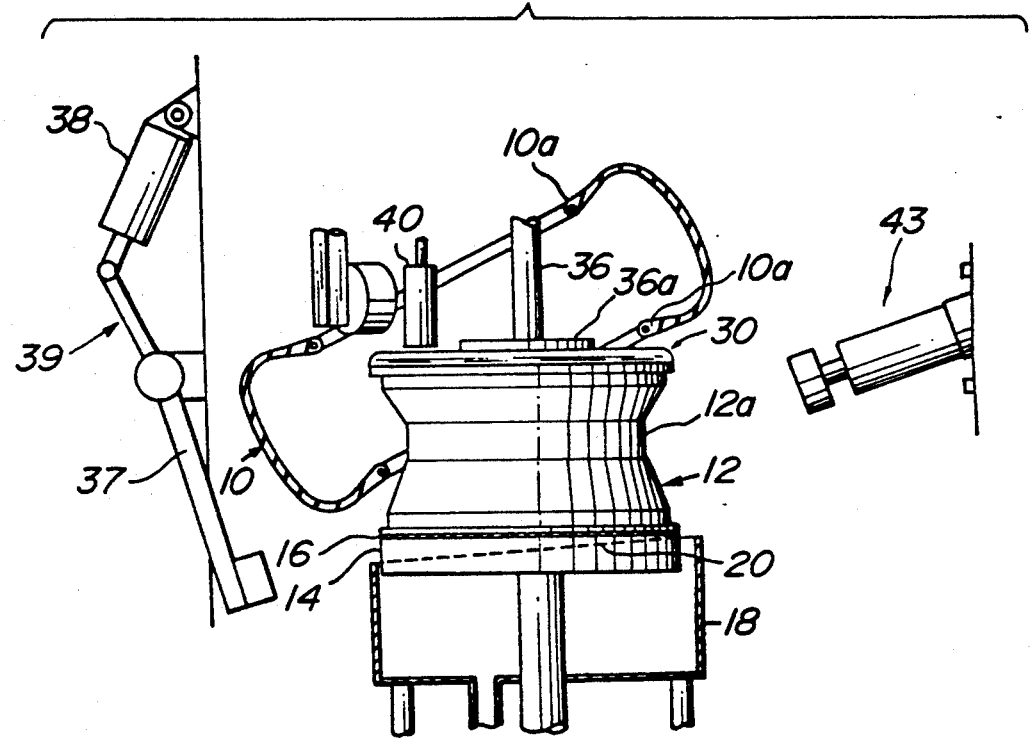
FIG_2
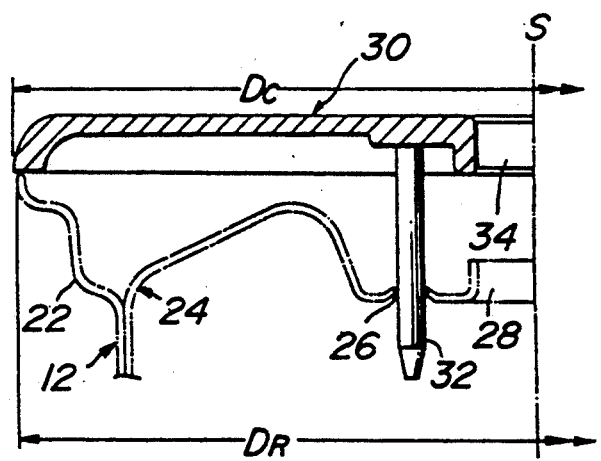

FIG_5a
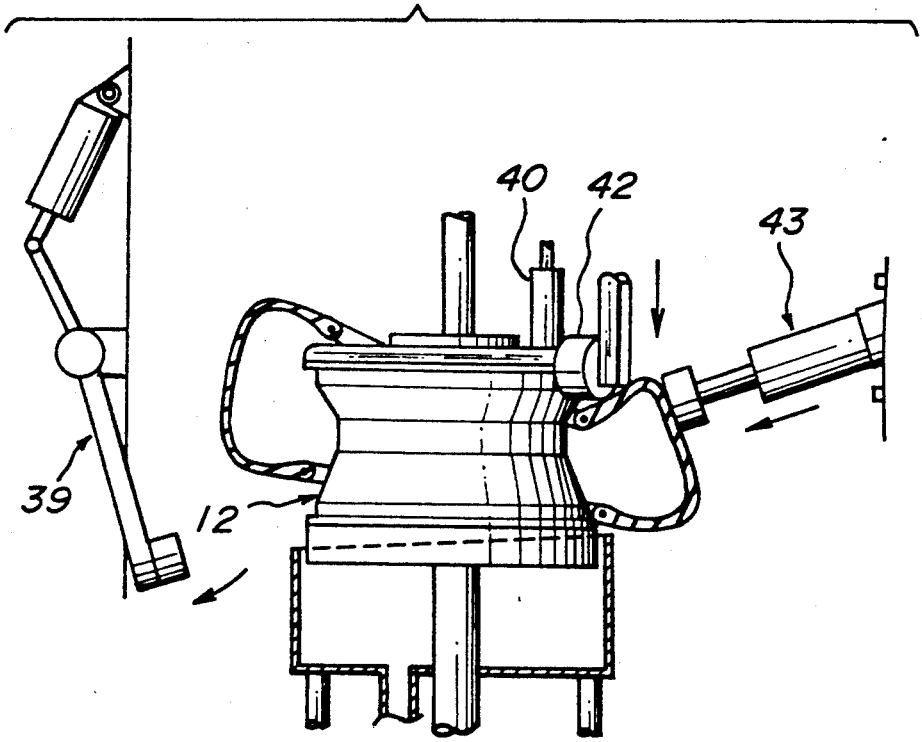
FIG_5b
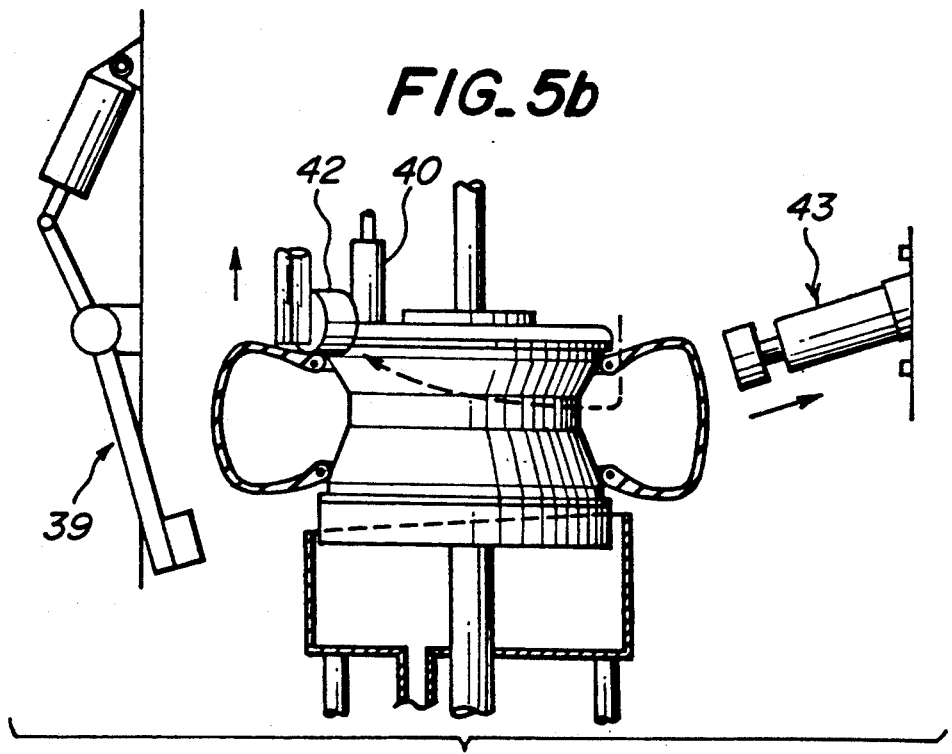

FIG_6a
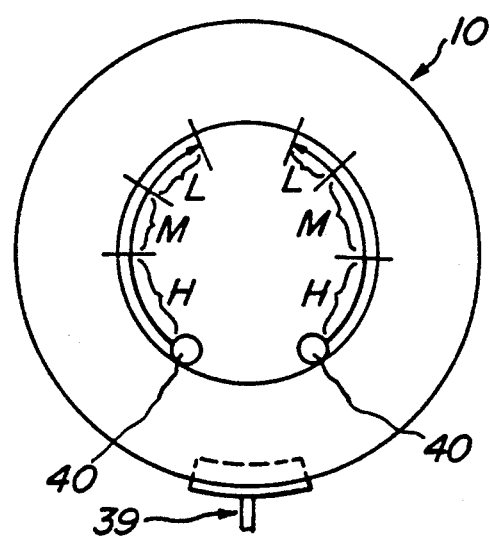
FIG_6b
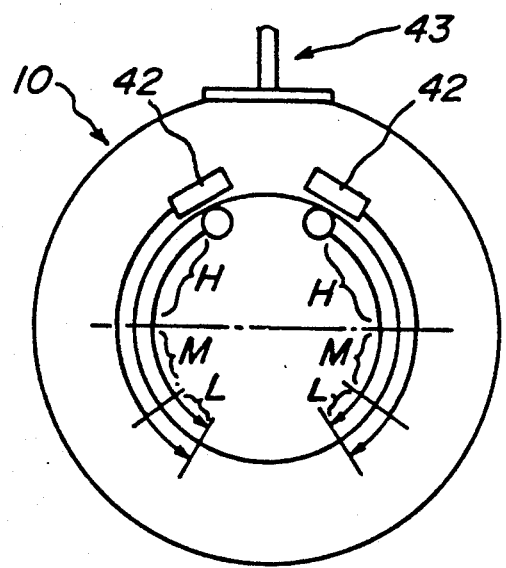

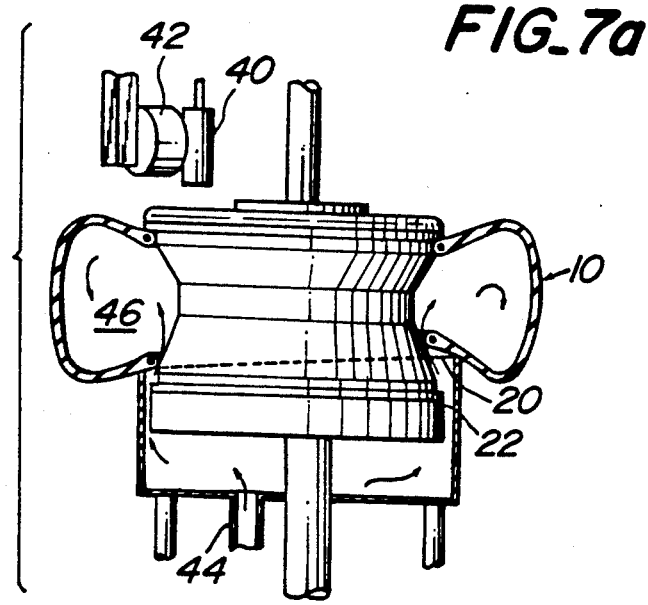
FIG_7a
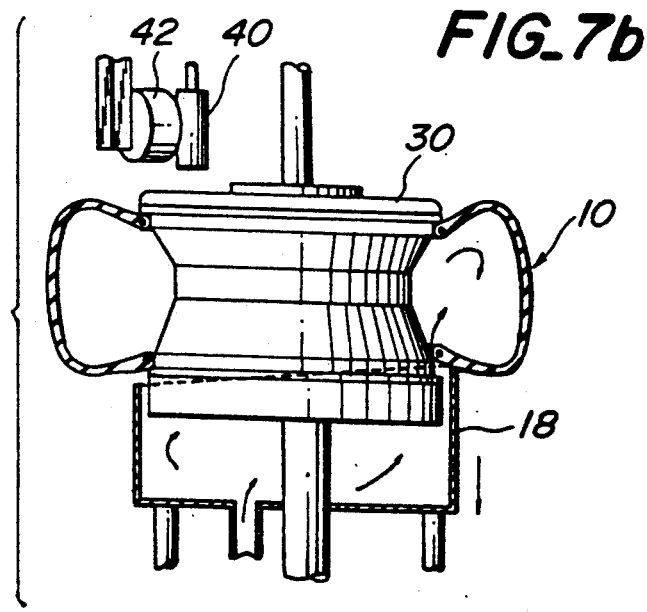
FIG_7b

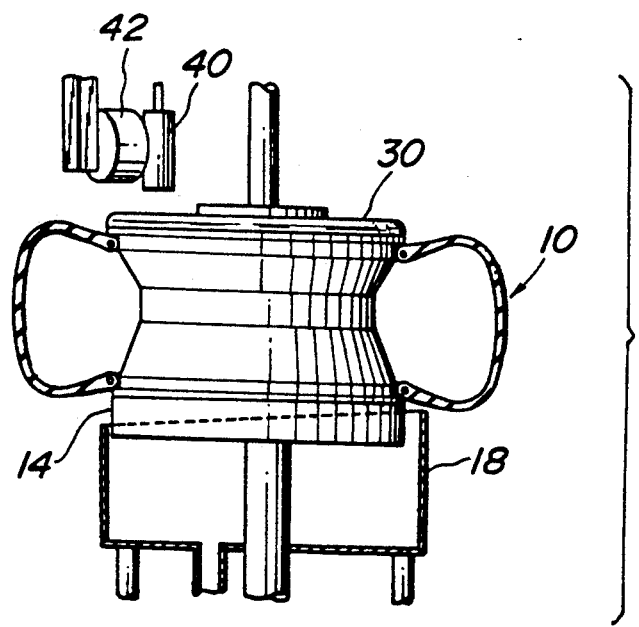
FIG_8

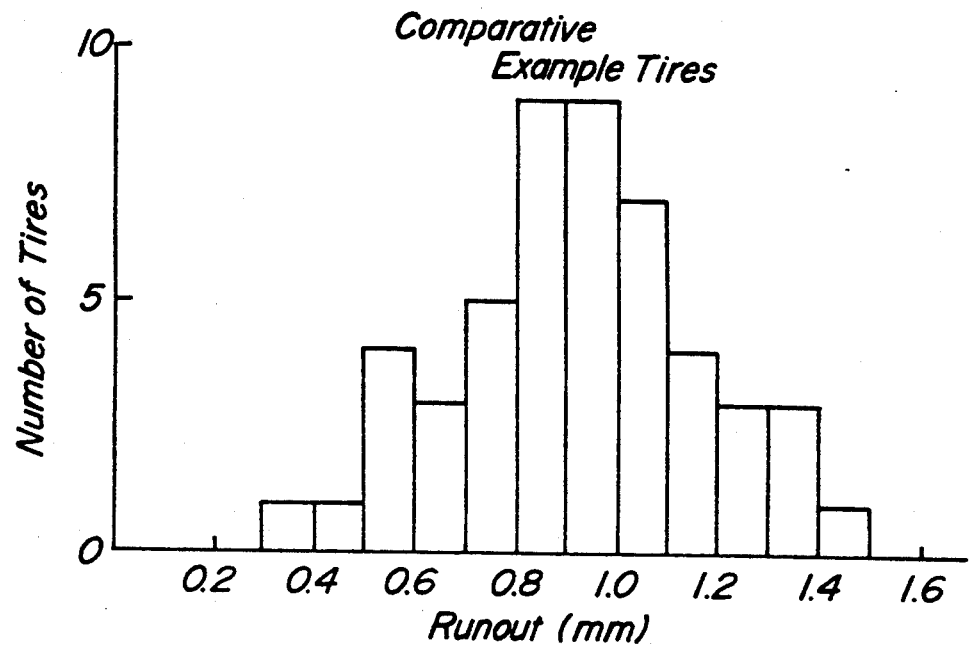
FIG_12a
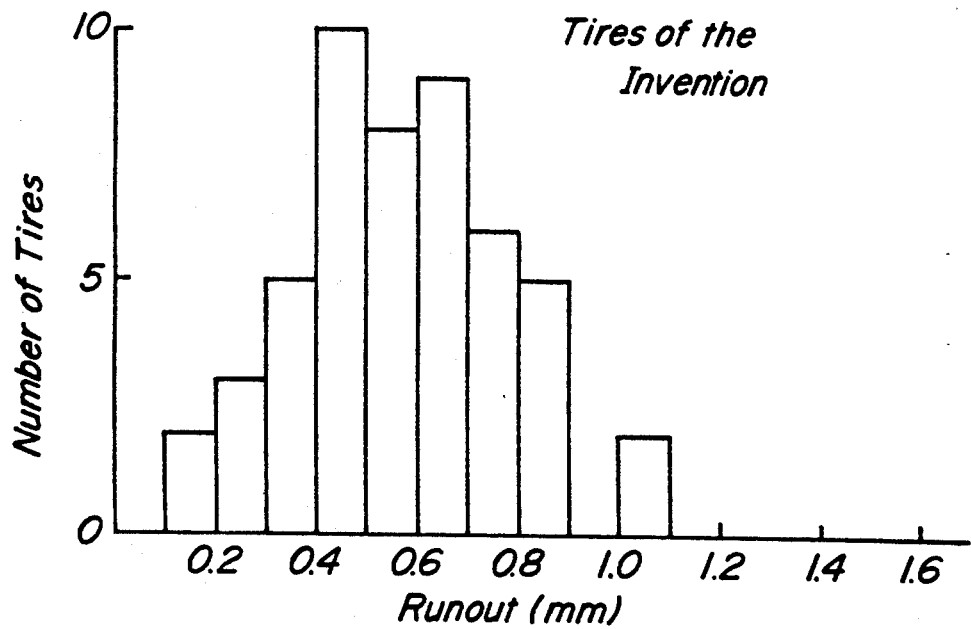
FIG_12b

METHOD AND APPARATUS FOR ASSEMBLING TIRE AND WHEEL

BACKGROUND OF THE INVENTION

This invention relates to a method for assembling a tire on a wheel without causing excessive deformations of bead portions of the tire, and an apparatus for carrying out the method.

A method for assembling a tire on a wheel was disclosed in Japanese Utility Model Application Laid-open No. 50-104,302. In mounting a tire on a wheel with this prior art apparatus, the wheel is arranged on the flat support surface of a vertically movable table and fixed thereat by means of a center cone extensible and contractible relative to the table and fitted in a hub hole formed in the wheel at its center. The tire is then arranged on the wheel in an oblique state so that the part of one bead portion of the tire on the side of the table is loosely arranged around the well formed in the disc of the wheel.

On the other hand, guide rollers previously arranged on revolving arms so as to be coaxial to the axis of the center cone, respectively, while restraining rollers, are provided on the revolving arms so as to be vertically movable. By revolving the arms, the one bead portion of the tire is radially expanded by the guide rollers, and the side surface rubber is urged downward by the vertically movable restraining rollers. In this manner, the bead portions of the tire are fitted one by one or simultaneously on the rims of the wheel.

In the method of the prior art, however, the last part of the bead portion not yet arranged on the rim is deformed straight like a chord relative to the annular flange of the rim shortly before termination of the arranging operation of the bead portion. In this state, when the guide rollers and the restraining rollers are further rolled for arranging that part of the bead portion around the rim, that part is subjected to excessive external forces and locally bent or curved at the chord-shaped portion and, in a worst case, damaged. Even if the bead portion of the tire is not damaged, the deformed bead portion detrimentally affects the close contact between the wheel and the bead portions to lower the tire uniformity and sealing performance so that the inherent performance of the tire mounted on the wheel could not be exhibited.

In order to solve such a problem, Japanese Utility Model Application Publication No. 61-34,885 proposed an apparatus including restraining rollers elastically supported by springs and adapted to revolve along a plane in parallel with the bead portion of a tire arranged obliquely to a support surface. This maintains constant urging forces acting upon the tire. However, this method does not take into consideration compensation for the difference between diameters of a wheel flange and tire bead portions Even if the restraining rollers are caused to revolve obliquely along the inclined surface, the problem described above due to the external force locally acting upon the bead portions could not be advantageously solved.

SUMMARY OF THE INVENTION

It is an object of the invention to provide a method for assembling a tire on a wheel and an apparatus for carrying out the method, which enable the tire to be assembled on the wheel without causing any deformation of bead portions of the tire.

In order to accomplish the object, in a method for assembling a tire and a wheel arranged on flat support surface so that a well of the wheel is positioned on the side remote from the support surface, the method according to the invention comprises steps of obliquely arranging the tire on a wheel cap-shaped jig provided on the upper side surface of the wheel to arrange the lower part of one bead portion on the side of the wheel cap-shaped jig around the wheel, inwardly urging the part of the tire whose bead portion is arranged around the wheel, while radially outwardly expanding the remaining part of the one bead portion to arrange it progressively along its circumference around the wheel, radially outwardly expanding the part of the other bead portion remote from the wheel cap-shaped jig and at the same time urging downward that part of the other bead portion toward the support surface to arrange it around the wheel, and inwardly urging the part of the tire corresponding to that part of the other bead portion arranged around the wheel, while radially outwardly expanding the remaining part of the other bead portion and at the same time urging downward the remaining part of the other bead portion toward the support surface progressively along the circumference of the other bead portion to arrange it around the wheel.

On the other hand, the apparatus for assembling a tire on a wheel according to the invention, comprises a support surface for supporting the wheel whose well is positioned on the side remote from the support surface, holding means for holding the wheel in position relative to the support surface, a pair of arm members revolvable about the rotating axis of the wheel in reverse directions relative to each other, guide rollers secured to the arm members, respectively, for radially outwardly expanding a bead portion of the tire, restraining rollers secured to the arm members, respectively, and vertically movable in the rotating axial directions of the wheel for urging downward the bead portion of the tire toward support surface, and urging means for urging the part of the tire arranged around the bottom of the wheel from the outside of the tire.

In assembling a tire on a wheel, the tire is obliquely arranged on the wheel arranged on the support surface such that the well of the wheel is on the side remote from the support surface. The lower part of a lower bead portion of the tire is thus loosely arranged around the wheel. The loosely arranged lower part of the lower bead portion is urged radially inwardly toward the wheel so that the diameter of the lower bead portion is reduced in the urged direction, but is increased in the direction perpendicular to the urged direction. Moreover, since the well of the wheel is positioned on the side remote from the support surface, the inclined angle of the tire to the wheel can be small so that the distance between the rotating axis of the wheel and the part of the lower bead portion diametrically opposed to the part of the lower bead portion loosely arranged around the wheel can be a value closer to the radius of the flange of the wheel.

Therefore, the remaining part of the lower bead portion can be arranged around the wheel without applying any excessive force upon the lower bead portion. Moreover, by radially outwardly expanding the remaining part of the lower bead portion, it can be arranged around the wheel in an easy manner. Consequently, the problem due to local forces acting upon bead portions can be advantageously solved. Moreover, the wheel cap-shaped jig fitted on the wheel on the side remote from the support surface makes the arrangement of the bead portion of the tire around the wheel much easier.

The invention will be more fully understood by referring to the following detailed specification and claims taken in connection with the appended drawings.

BRIEF DESCRIPTION OF THE DRAWINGS

FIG. 1 is an explanatory view illustrating a tire obliquely arranged on a wheel to be assembled according to the invention;

FIG. 2 is a partial sectional view illustrating the wheel provided with a wheel cap-shaped jig according to the invention;

FIGS. 5a and 5b are explanatory views illustrating two steps of arranging the upper bead portion onto the wheel according to the invention, respectively;

FIGS. 6a and 6b are explanatory views illustrating operating speeds of guide rollers and restraining rollers according to the invention, respectively;

FIGS. 7a and 7b are explanatory views illustrating two steps of filling inner pressure in the tire assembled on the wheel according to the invention, respectively;

FIG. 8 is a view illustrating the tire filled with the inner pressure according to the invention;

FIG. 12a is a graph illustrating the relation between maximum radial runouts and the numbers of tires assembled on wheels by the use of the apparatus of the prior art and filled with inner pressure; and FIG. 12b is a graph illustrating the relation between maximum radial runouts and the numbers of tires assembled on wheels by the use of the apparatus according to the invention and filled with inner pressure.

DESCRIPTION OF THE PREFERRED EMBODIMENTS

Figure 3:
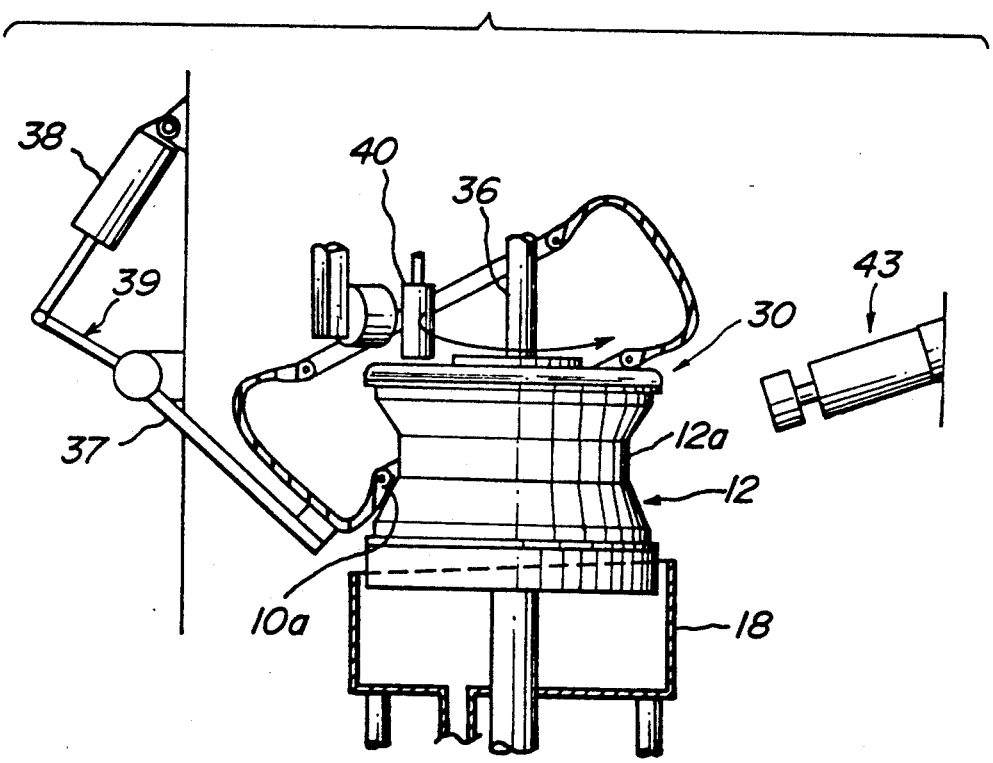
FIG. 3 is an explanatory view illustrating the state of a tire whose lower bead portion on the side of the wheel is being arranged around the wheel according to the invention.

As schematically shown in FIG. 1, an inner cylinder member 14 having at its top a flat support surface is arranged vertically movably in its axial directions, and a wheel 12 for assembling a tire 10 thereon is arranged on the flat support surface of the inner cylinder member 14. A sheet 16 made of a rubber or rubber-like elastomer is attached to the support surface of the inner cylinder member 14 so that it engages the wheel 12 with the entire circumference in an air-tight manner. The rotating axis of the wheel 12 is substantially perpendicular to the support surface of the inner cylinder member 14. It is preferable to arrange the wheel 12 on the inner cylinder member 14 such that the bottom or well 12a of the wheel 12 is on the side of a wheel cap-shaped jig 30 or remote from the inner cylinder member 14. The reason will be explained later.

In general, as schematically illustrated in FIG. 2, the wheel 12 includes rims 22 on which tire bead portions are mounted and held, and a disc 24 supporting thereon the rims 22. The wheel 12 is adapted to be securely fixed to an axle of a vehicle (not shown) by threadedly engaging nuts on fixing bolts of the wheel hub of the vehicle extending through bolt-through-apertures 26 formed in the disc 24 of the wheel 12 circumferentially spaced from one another. The disc 24 of the wheel 12 is formed at its center with an axle receiving hole 28 for receiving therein the outer end of the wheel hub.

As shown in FIG. 1, an outer cylinder member 18 is arranged to surround the inner cylinder member 14 in a relatively telescopical relationship. The outer cylinder member 18 is vertically movable in the axial directions of the wheel 12 independently from the inner cylinder member 14. The annular end surface 20 of the outer cylinder member 14 facing to the wheel 12 is inclined relative to the rotating axis of the wheel 12. The functions of the inner and outer cylinder members 14 and 18 will be explained in detail later.

The wheel cap-shaped jig 30 is arranged on and abuts against the rim 22 of the wheel 12 on the side remote from the inner cylinder member 14, in more concretely, on the maximum, width portion of the rim flange of the disc 24. The wheel cap-shaped jig 30 has a configuration shown by way of example in FIG. 2 which serves to facilitate arranging a tire bead portion around the wheel 12. The wheel cap-shaped jig 30 of the illustrated embodiment has a shape substantially in symmetry with respect to its rotating axis S. The periphery of the wheel cap-shaped jig 30 has the outer diameter DC equal to or slightly larger than the maximum outer diameter DR of the flange of the rim 22 and progressively decreases in outer diameter as it is remote from the rim 22 in the direction of the thickness of the wheel cap-shaped jig 30.

Moreover, the wheel cap-shaped jig 30 can readily be positioned relative to the wheel 12 by inserting engaging pins 32 in the bolt-through-apertures 26 of the wheel 12 and is formed with a centering hole 34 which is concentric to the axle receiving hole 28 of the wheel 12 when the engaging pins 32 are inserted into the bolt-through-apertures 26 of the wheel 12. It is preferable that the maximum diameter DC of the wheel cap-shaped jig 30 is at the most 2 mm larger than that of the rim flange of the wheel 12.

After the wheel 12 is arranged on the support surface of the inner cylinder member 14 through the elastic sheet 16 and the wheel cap-shaped jig 30 is fitted onto the free upper end of the wheel 12, a tire 10 is arranged obliquely on the wheel 12 so that the lower bead portion 10a of the tire 10 is positioned obliquely relative to the rotating axis of the wheel 12 as shown in FIG. 1. The "lower" bead portion used herein is one of the two bead portions, which is positioned on the lower side of the tire 10 and directly supported by the wheel cap-shaped jig 30. As a result, the lower part of the lower bead portion 10a is loosely arranged around the well 12a of the wheel 12, while the remaining part of the lower bead portion 10 is partially supported by the wheel cap-shaped jig 30.

In this case, since the diameter of the well 12a is less than that of the lower bead portion 10a, the distance between the rotating axis of the wheel 12 and the upper part of the bead portion diametrically opposed to the lower part of the bead portion loosely arranged around the well 12a of the wheel is a value close to the radius of the flange of the wheel 12.

As described above, therefore, it is advantageous to arrange the wheel 12 on the support surface of the inner cylinder member 14 such that the bottom or well 12a of the wheel 12 is on the side remote from the support surface of the inner cylinder member 14. That is, it is located on the side of the wheel cap-shaped jig 30 in order to enlarge the distance between the rotating axis of the wheel 12 and the upper part of the lower bead portion 10a to make easier the mounting operation of the tire 10. Thereafter, the centering hole 34 of the wheel cap-shaped jig 30 and the axle receiving hole 28 of the wheel 12 are brought into alignment with each other by inserting a suitable centering pin 36 into the centering hole 34 and the axle receiving hole 28. The wheel cap-shaped jig 30 is then urged and fixed to the wheel 12 by means of a restraining plate 36a provided on the centering pin 36.

As shown in FIG. 3, the lower part of the lower bead portion 10a loosely arranged around the well 12a of the wheel 12 is urged on the outside of the tire toward the rotating axis of the, wheel 12 by means of first urging means 39. It has an arm 37 whose mid portion is pivotally connected to, for example, a stationary frame of the apparatus and whose one end is connected to the output shaft of a hydraulic cylinder 38 whose cylinder head end is also pivotally connected to the stationary frame. As a result, the urged lower part of the lower bead portion 10a is securely arranged on the well 12a, while the remaining part of the lower bead portion 10a to be subsequently fitted on the well 12a is forced in directions substantially perpendicular to the urged direction so as to enlarge the diameter of the lower bead portion 10a. The result is that the remaining part of the lower bead portion 10a can be easily fitted on the well 12a of the wheel 12 as explained in the next paragraph.

Figure 4A:
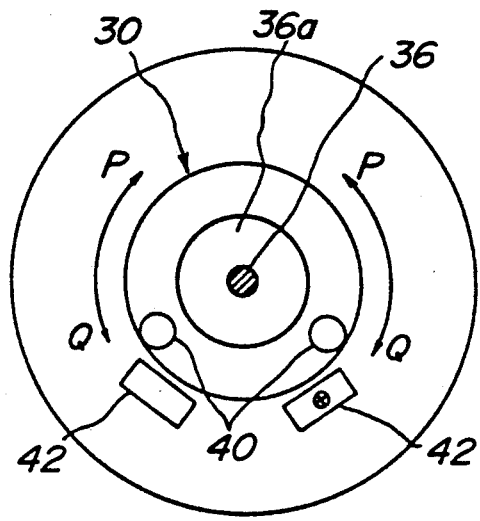
FIG. 4a is a schematic explanatory view seen from the side of the wheel cap-shaped jig illustrating the state of the lower bead portion fitting on the wheel according to the invention.

As shown in FIG. 4a, a pair of guide rollers 40 adapted to rotate about the centering pin 36 are rolled along the lower bead portion 10a in reverse directions shown by arrows P toward the upper part of the lower bead portion diametrically opposed to the lower part of the bead portion 10a already arranged around the well 12a of the wheel 12. As a result, the remaining part of the lower bead portion is expanded so that the lower bead portion falls by gravity onto the well 12a to be arranged therearound.

In more detail, referring again to FIGS. 4a and 4b, while the lower part of the lower bead portion 10a loosely arranged around the well 12a of the wheel 12 is being urged radially inwardly by the first urging means 39 toward the well, the pair of guide rollers 40 arranged at the position of the loosely arranged lower part of the lower bead portion 10a are rolled in the reverse directions shown by the arrows P along the lower bead portion 10a to expand the lower bead portion 10a progressively radially outwardly. This enables the lower bead portion 10a to fall onto the well 12a of the wheel 12 completely.

Figure 4B:
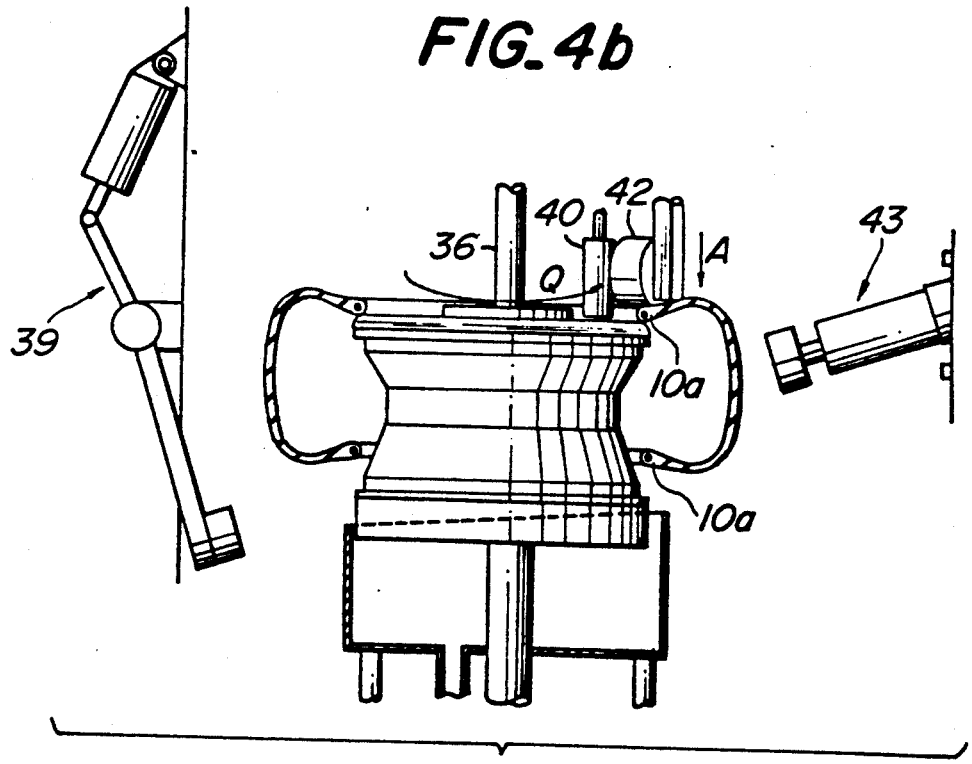
FIG. 4b is an explanatory view illustrating the state of the lower bead portion has been arranged around the wheel according to the invention.

When the lower bead portion has been completely arranged around the wheel 12 in this manner, the upper bead portion 10a is located along the periphery of the wheel cap-shaped jig 30 as shown in FIG. 4b. The upper bead portion is then progressively expanded radially outwardly by means of the guide rollers 40 rolling along the upper bead portion 10a in the directions shown by arrows Q in FIG. 4a. A pair of restraining rollers 42 arranged outwardly of the guide rollers 40 are lowered to press the side surface of the tire downward. As a result, the part of the upper bead portion urged downward by the restraining rollers 42 slides down the periphery of the wheel cap-shaped jig 30 to be loosely arranged around the well 12a of the wheel 12.

Thereafter, the radially outer surface or the tread of the tire corresponding to the part of the upper bead portion loosely arranged around the well 12 is urged radially inwardly by means of second urging means 43 having a hydraulic cylinder whose head end is pivotally connected to the stationary frame as shown in FIG. 5a. As a result, that part of the upper bead portion is securely arranged around the well 12a of the wheel 12, while the bead portion is expanded in the directions perpendicular to the urging direction of the second urging means 43 to facilitate arranging the bead portion around the wheel.

In actuating the second urging means 43, the first urging means 1 is returned into the direction shown by an arrow on the left side of FIG. 5a to its poised position. The restraining rollers 42 are rolled about the centering pin 36 along the upper bead portion in the directions shown by the arrows Q in FIG. 4a in synchronism with the guide rollers 40 so that the bead portion is progressively arranged around the well 12a of the wheel 12 to complete the rim-assembling the tire 10 on the wheel 12. The second urging means 43 is returned to its poised position, and the guide rollers 40 and the restraining rollers 42 are raised away from the wheel 12 to their poised positions. Such operations are shown by arrows in broken lines in FIG. 5b.

In moving the guide rollers 40 and the restraining rollers 42 in the circumferential direction of the wheel to force the lower bead portion onto the wheel 12, the pair of guide rollers 40 are preferably moved at a relatively higher speed (H) until the about half of the bead portion has been arranged around the well of the wheel 12, thereafter at a medium speed (M) for a while, and at a relatively slower speed (L) just before the end of the movement of the guide rollers 40 as shown in FIG. 6a.

This is because relatively large and rapid deformation is permitted for the bead portions during the initial period of the mounting operation of the bead portion onto the wheel. But, it is not permitted shortly before the end of the operation since there is a risk of the bead portions being damaged by such a large and rapid deformation when the principal parts of the bead portions have been arranged around the well of the wheel. Moreover, in order to carry out the operations with high efficiency it is advantageous to change the moving speeds of the rollers to match the present operating state.

This holds true in the upper bead portion of the tire. In moving the guide rollers 40 and the restraining rollers 42 in the circumferential direction of the wheel to force the upper bead portion onto the wheel 12, the pair of guide rollers 40 are preferably moved at a relatively higher speed (H) until the about half of the bead portion has been arranged on the well of the wheel 12, thereafter at a medium speed (M) for a while, and at a relatively slower speed (L) just before the end of the movement of the guide rollers 40 as shown in FIG. 6b. In this case, in response to the movement of the guide rollers 40, the restraining rollers 42 are moved at speeds varied in the same manner as in the rollers 40. Moreover, it does not necessarily require rolling the guide rollers along all the bead portions because they fall onto the wheel by gravity after they have been arranged around the well of the wheel to a certain extent.

Moreover, the restraining rollers 42 are urged downward to bring the bead portion into a position corresponding to the well 12a of the wheel until about half of the bead portion has been arranged around the well. Thereafter the restraining rollers 42 are progressively raised and spaced from the tire 10 at the termination of the arranging of the bead portion as shown in the arrow in broken line in FIG. 5b, thereby further facilitating the operation.

When the bead portions of the tire have been completely mounted on the wheel, the inner and outer cylinder members 14 and 18 are raised from their poised positions so that the sheet 16 of the inner cylinder member 14 is brought into abutment against the end face of the wheel 12 in an air-tight manner, while the inclined annular end surface 20 of the outer cylinder member 18 is brought into close contact with the side surface or sidewall of the tire over its whole circumference to form an air-tight space in cooperation with the tire 10 and the wheel 12 as shown in FIG. 7a. Pressurized air is then supplied into the interior 46 of the tire through the clearance between the inner and outer cylinder members and a piping 44 connected to a pressurized air source such as an air compressor.

As a result, the upper bead portion of the tire on the side of the wheel cap-shaped jig 30 can be brought into close contact with the rim of the wheel associated therewith in an air-tight manner prior to the lower bead portion on the side of the inner cylinder member 14. The first and second urging means will not be shown in the drawings in connection with the following explanation since these means do not have any direct roles.

The pressurized air is continuously supplied into the interior of the tire 10, while the outer cylinder member 18 is lowered relative to the inner cylinder member 14. Before such a downward movement of the outer cylinder member 18, the lower bead portion is restrained from outward movement in the width direction of the wheel by the inclined annular end surface 20 of the outer cylinder member 18 in close contact with the sidewall of the tire over its whole circumference. By the downward movement of the outer cylinder member 18, the restriction of the lower bead portion by the outer cylinder 18 is progressively released As shown in FIG. 7b, therefore, first the portion of the lower bead portion remote from the wheel cap-shaped jig 30, that is, the left end of the bead portion close contact its rim. As the outer cylinder member 18 is continuously lowered, the remaining part of the lower bead portion successively rides over the hump of the wheel and ultimately close contact the rim of the wheel over its whole circumference as shown in FIG. 8. The inner and outer cylinder members 14 and 18 are lowered to complete the tire and rim assembling sequence and inner pressure filling.

As can be seen from the above explanation, according to the invention the bead portions with all their circumferences need not ride over the humps of the wheel simultaneously for filling the inner pressure into the tire assembled on the rims of the wheel. Only the portions of the bead portions obliquely intersecting with the humps need to ride over the humps of the wheel little by little. Accordingly, only small force suffices to cause the bead portions to ride over the humps of the wheel. The pressure of the order of 1 kg/cm2 suffices to bring bead portions into close contact with rims according to the invention, while the pressure of the order of 4 to 6 kg/cm² has been required in the prior art. According to the invention, therefore, the bead portions of a tire are not subjected to excessive pressure in mounting the tire on the wheel.

Therefore, as all the operations including the tire-rim assembling can be effected without any excessive force acting upon the bead portions, they can be brought into close contact with the wheel uniformly over its entire circumference without causing any damage to the bead portions. While the above embodiment including the filling operation of pressurized air into the tire has been explained, it will be apparent that the invention is applicable to a wheel supported only by a flat table.

Figure 9:
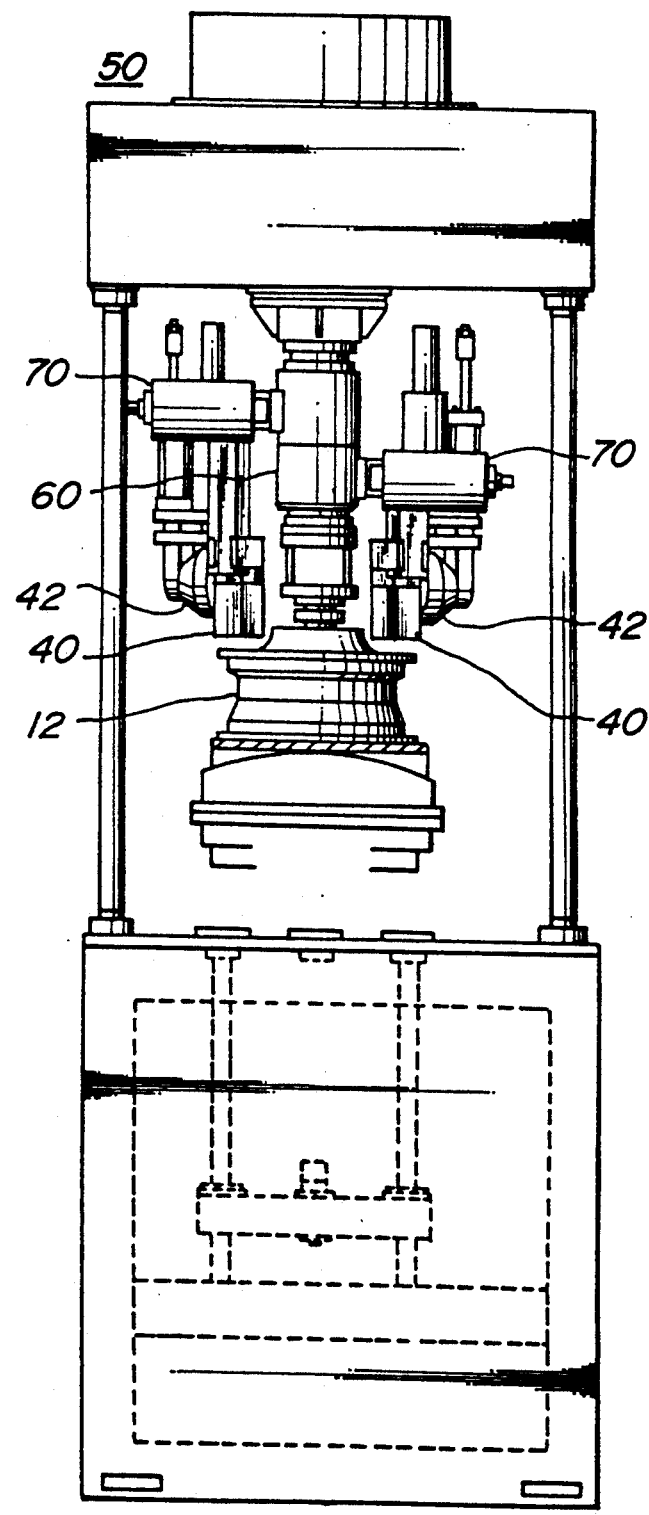
FIG. 9 is a front view illustrating the apparatus according to the invention.

A preferable apparatus for carrying out the method described above is shown in FIGS. 9 and 10. The apparatus 50 comprises a table 56 movable upward and downward along guides 54 by means of a reciprocatively acting fluid pressure cylinder 52. The table 54 supports thereon an inner cylinder member 14 and has reciprocatively acting fluid pressure cylinders 58 fixed to the table 54. An outer cylinder member 18 is secured to output shafts of the fluid pressure cylinders 58 surround the inner cylinder member 14 through a suitable sealing member interposed therebetween and movable in the axial directions of the output shafts relative to the inner cylinder member 14.

Figure 10:
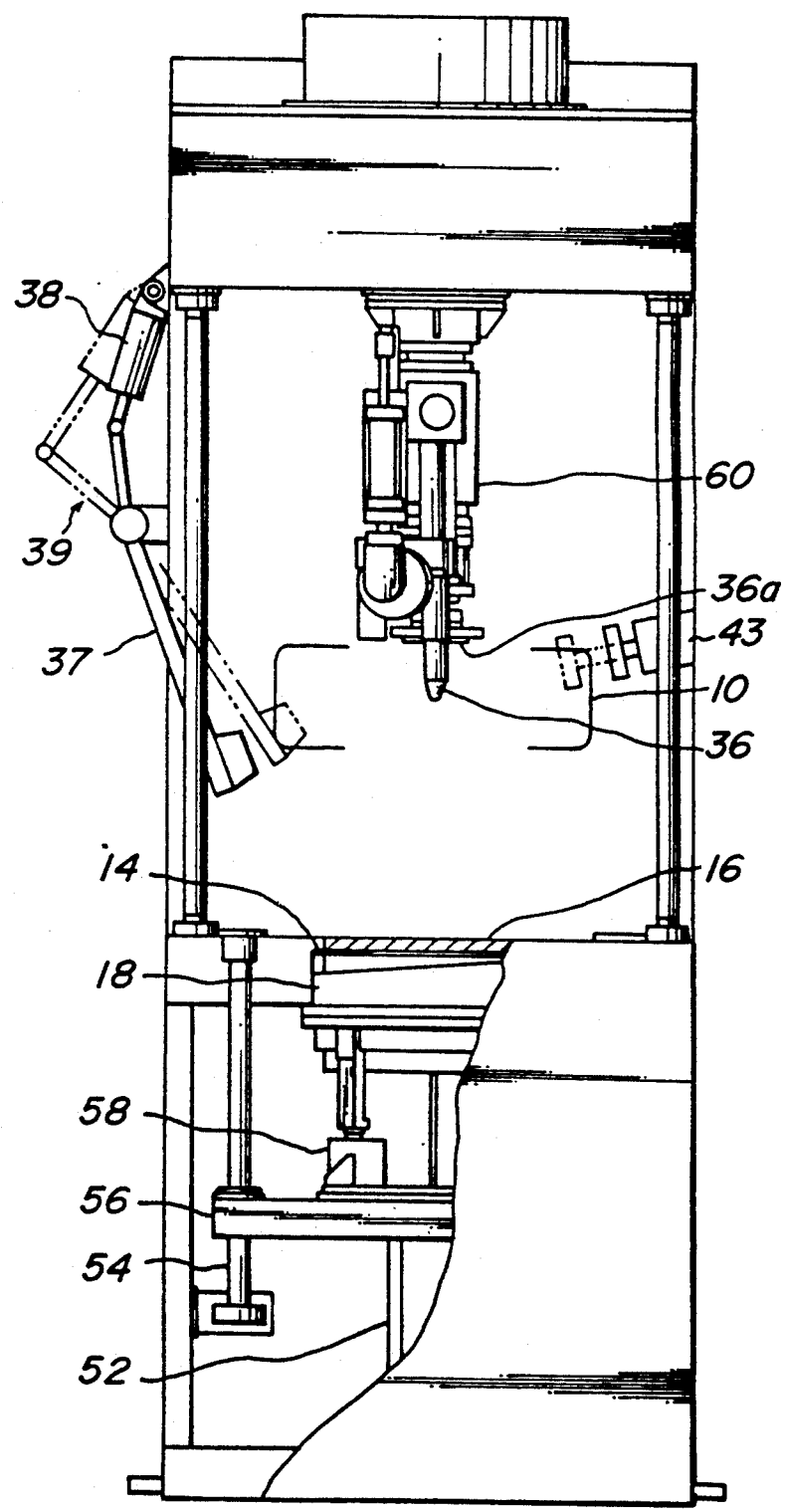
FIG. 10 is a side view illustrating the apparatus shown in FIG. 9.

An annular end surface of the outer cylinder member 18 is inclined to the rotating axis of a wheel 12 as clearly shown in FIG. 10. The degree of the inclination of the annular end surface is within a range to fulfill conditions that the annular end surface is in close contact with one side surface of a tire over its whole circumference when the outer cylinder member 18 is in its extended position by the action of the fluid pressure cylinder 58. The annular end face partially progressively moves away from the side surface of the tire as the outer cylinder member 18 is being lowered relatively to the inner cylindrical member 14, and the annular end surface is ultimately completely out of contact with the side surface of the tire in the retracted position of the outer cylinder member 18. The difference between the maximum and minimum heights of the inclined annular end surface is of the order of 5 to 20 mm in the rotating axial direction of the wheel 12.

An air-tight space is defined by the outer cylinder member 18 engaging the side surface of the tire in cooperation with the inner cylinder member 14. Pressurized air is supplied into the air-tight space from an operating pressure source (not shown) through a through-aperture (not shown) formed in the side surface of the outer cylinder member. A sheet 16 is provided on the end surface of the inner cylinder member 14 as a support surface for maintaining the abutment of the wheel 12 against the inner cylinder member 14 in an air-tight manner.

The apparatus 50 further comprises a shaft 60 arranged coaxially in opposition to the inner and outer cylinder members 14 and 18 arranged coaxially telescopically. The shaft 60 has a centering pin 36 and a restraining plate 36a. When the inner cylinder member 14 is raised, the centering pin 36 is fitted into the axle receiving hole of the wheel 12 arranged on the support surface of the inner cylinder member 14 for centering the wheel 12 on the inner cylinder member 14. The restraining plate 36a serves to urge against the wheel 12 a wheel cap-shaped jig 30 arranged coaxially to the rim of the wheel 12 remote from the support surface of the inner cylinder member.

Fluid cylinders constituting first and second urging means 39 and 43 are pivotally connected to a frame of the apparatus 50 with their cylinder head ends, respectively. An arm 37 has one end pivotally connected to the piston rod end of the fluid cylinder 38 for the first urging means 39 and a mid portion pivotally connected to the frame of the apparatus 50. The arm 37 is provided at the other end with an urging member which urges the tire 10 inwardly in response to the operation of the fluid cylinder 38. On the other hand, an urging member is directly connected to the piston rod end of the cylinder for the second urging means 43 to urge the tire 10. The urging member of the first urging means 39 may be directly connected to the fluid cylinder as in the second urging means 43.

Figure 11:
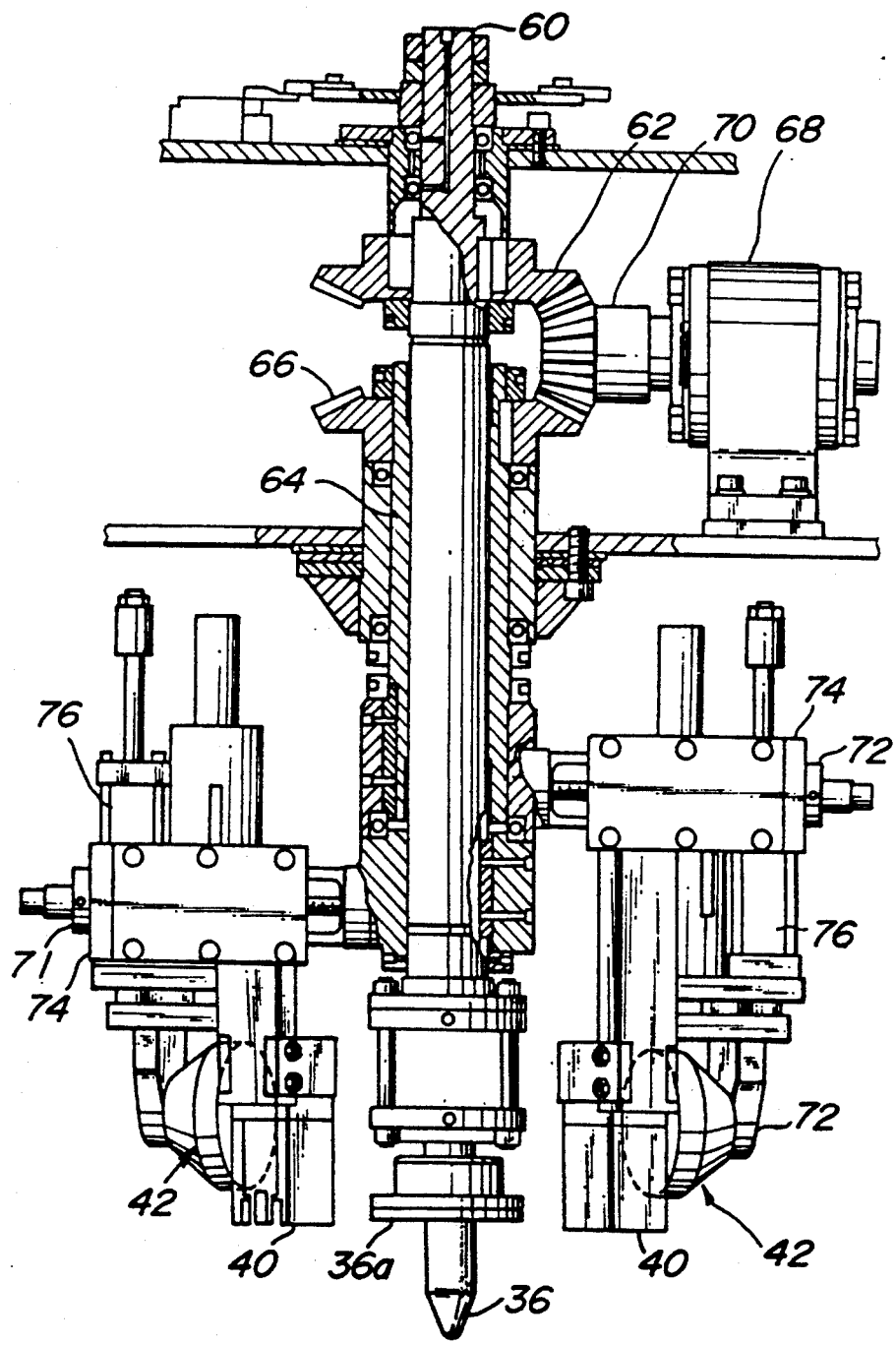
FIG. 11 is an enlarged view illustrating the main parts of the apparatus shown in FIG. 9.

As shown in FIG. 11, the shaft 60 further comprises a first bevel gear 62 integrally fixed thereto on the side remote from the centering pin 36, and a second bevel gear 66 integrally fixed to a rotatable sleeve 64 secured to the shaft 60 rotatably relative thereto. The first and second bevel gears 62 and 66 are in mesh with a third bevel gear 70 fixed to the output shaft of a driving motor 68 so that the shaft 60 and the sleeve 64 are rotated in opposite directions. Moreover, the shaft 60 and the sleeve 64 are supported rotatably relative to each other on the frame of the apparatus with suitable bearing means, respectively.

Arm members 71 and 72 are fixed to the shaft 60 and the sleeve 64, respectively, and extend substantially perpendicularly to the rotating axes of the shaft 60 and the sleeve 64. The arm members 71 and 72 form a pair of revolving units and rotate in opposite directions by energizing the driving motor 68. A support plate 74 is secured to each of the arm members 71 and 72 to be shiftable in the extending directions of the arm member or in the directions perpendicular to the rotating axis of the shaft 60. A guide roller 40 is mounted on each of the support plates 74 substantially in parallel with the rotating axis of the shaft 60.

Moreover, fluid cylinders 76 are mounted on the support plates 74, respectively, whose output shafts are reciprocatively movable in parallel with the rotating axis of the shaft 60. Restraining rollers 42 are secured to the output shafts of the fluid cylinders 76, respectively. With this arrangement, the restraining rollers 42 are able to extend and retract in the extending directions of the shaft 60 and to urge downward the side surface of the tire relative to the wheel 12. The guide rollers 40 may of course be mounted on the support plates 74 by means of other fluid cylinders.

COMPARATIVE EXAMPLE

For the sake of completeness, in order to compare the apparatus according to the invention with the prior art apparatus, the following experiment was carried out. Tires of 195/60 R14 were mounted on aluminum wheels of 6-JJ×14 and filled with inner pressure of 2.0 kg/cm$^2$ by the use of the apparatuses according to the invention and the prior art, respectively. Radial runouts at the centers of tire treads were measured. The term "radial runout" used herein means a "deflection" at the center of the tread of a tire and is indicated by a maximum deflection over one circumference of the tire. Results are shown in FIGS. 12a and 12b. In this experiment, the fifty tires were used for the present invention and the prior art, respectively.

As can be seen from the graphs in FIGS. 12a and 12b, the tires mounted on the wheels by the use of the apparatus according to the invention exhibit as a whole smaller radial runouts than those according to the prior art. It is clear that the present invention enables the tires to be mounted on the wheels with more symmetry than in the prior art.

As described above, according to the invention bead portions of a tire can be brought into close contact with rims of a wheel uniformly without causing any deformation of the bead portions in comparison with the prior art. Therefore, the invention can completely prevent vibrations, air leakage and the like due to deformations of bead portions of the tire.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A method for assembling a tire and a wheel arranged on a flat support surface so that a well of the wheel is positioned on the side remote from the support surface, comprising steps of obliquely arranging the tire on a wheel cap-shaped jig provided on the upper side surface of the wheel to drop a portion of the lower part of one bead portion on the side of the wheel cap-shaped jig into the well of the wheel, inwardly urging the part of the tire whose bead portion is dropped into the well of the wheel, while radially outwardly expanding the remaining part of the one bead portion to arrange it progressively along its circumference around the wheel, radially outwardly expanding the part of the other bead portion remote from the wheel cap-shaped jig and at the same time urging downward that part of the other bead portion toward the support surface to drop it into the well of the wheel, and inwardly urging the part of the tire corresponding to that part of the other bead portion dropped into the well of the wheel, while radially outwardly expanding the remaining part of the other bead portion and at the same time urging downward the remaining part of the other bead portion toward the support surface progressively along the circumference of the other bead portion to arrange it around the wheel.

2. The method as set forth in claim 1, wherein the wheel cap-shaped jig has a shape substantially in symmetry with respect to its rotating axis and having the outer diameter not smaller than the maximum outer diameter of the flange of rims of the wheel and progressively decreasing as it is remote from the wheel in the direction of the thickness of the wheel cap-shaped jig.

3. The method as set forth in claim 2, wherein the wheel cap-shaped jig is positioned relative to the wheel by inserting engaging pins in the bolt-through-apertures of the wheel.

4. The method as set forth in claim 1, wherein in radially outwardly expanding the one bead portion of the tire, a pair of revolvable guide rollers are rolled along the bead portion in reverse directions toward the part of the bead portion diametrically opposed to the part of the bead portion already arranged around the wheel.

5. The method as set forth in claim 1, wherein in radially outwardly expanding and urging downward the other bead portion, a pair of revolvable guide rollers are rolled along the bead portion in reverse directions, while a pair of restraining rollers arranged outwardly of the guide rollers are lowered to press the side surface of the tire downward.

6. The method as set forth in claim 4, wherein the pair of guide rollers are moved at a relatively higher speed until the about half of the bead portion has been arranged around the wheel, thereafter at a medium speed for a while, and at a relatively slower speed just before the end of the movement of the guide rollers.

7. The method as set forth in claim 5, wherein the pair of guide rollers and the pair of restraining rollers are moved in synchronism with each other at a relatively higher speed until the about half of the bead portion has been arranged around the wheel, thereafter at a medium speed for a while, and at a relatively slower speed just before the end of the movement of the guide rollers and the restraining rollers.

8. The method as set forth in claim 5, wherein the restraining rollers are urged downward so as to bring the bead portion into a position corresponding to the well of the wheel until the about half of the bead portion has been arranged around the well, and thereafter the restraining rollers are progressively raised and spaced from the tire at the termination of the arranging of the bead portion.

9. The method as set forth in claim 1, wherein the flat support surface is the annular top surface of an inner cylinder member vertically movable and surrounded by an outer cylinder member vertically movable and having an inclined annular end surface, and when the bead portions of the tire have been completely arranged around the wheel, the inner and outer cylinder members are raised from their poised positions so that the annular top surface sheet of the inner cylinder member is brought into abutment against the end face of the wheel in an air-tight manner, while the inclined annular end surface of the outer cylinder member is brought into close contact with the side surface of the tire over its whole circumference to form an air-tight space in cooperation with the tire and the wheel and pressurized air is then supplied into the interior of the tire through the clearance between the inner and outer cylinder members.

10. An apparatus for assembling a tire on a wheel, comprising a support surface for supporting the wheel whose well is positioned on the side remote from the support surface, holding means for holding the wheel in position relative to the support surface, a pair of arm members revolvable about the rotating axis of the wheel in reverse directions relative to each other, guide rollers secured to the arm members, respectively, for radially outwardly expanding a bead portion of the tire, restraining rollers secured to the arm members, respectively, and vertically movable in the rotating axial directions of the wheel for urging downward the bead portion of the tire toward support surface, and urging means for urging the part of the tire arranged around the bottom of the wheel from the outside of the tire.

11. The apparatus as set forth in claim 10, wherein the holding means comprises a shaft having a centering pin to be fitted into the axle receiving hole of the wheel arranged on the support surface when the wheel is raised, and a restraining plate for urging the wheel against the support surface.

12. The apparatus as set forth in claim 10, wherein the apparatus comprises a shaft rotatably supported by a frame of the apparatus, a sleeve surrounding the shaft and rotatably supported by the frame, said arm members being fixed to the shaft and the sleeve, respectively, to extend substantially perperdicularly to the rotating axes of the shaft and the sleeve, a first bevel gear fixed to the shaft, a second bevel gear fixed to the sleeve, and a third bevel gear fixed to the output shaft of a driving motor so as to be in mesh with the first and second bevel gears.

13. The apparatus as set forth in claim 10, wherein the apparatus further comprises support plates secured to said arm members so as to be shiftable in the extending directions of the arm members, respectively, said guide rollers being mounted on the support plates substantially in parallel with the rotating axis of the shaft, respectively, and fluid cylinders mounted on the support plates, respectively, whose output shafts are reciprocatively movable in parallel with the rotating axis of the shaft, said restraining rollers being secured to the output shafts of the fluid cylinders, respectively.

14. The apparatus as set forth in claim 10, wherein the urging means comprises a hydraulic cylinder whose cylinder head end is pivotally connected to a frame of the apparatus, and an arm whose mid portion is pivotally connected to the frame and whose one end is connected to the output shaft of the hydraulic cylinder.

15. The apparatus as set forth in claim 10, wherein the urging means comprises a hydraulic cylinder whose cylinder head end is pivotally connected to a frame of the apparatus, and an arm connected to the output shaft of the hydraulic cylinder.

* * * * *